(12) United States Patent
Ude (10) Patent No.: US 9,970,828 B2
(45) Date of Patent: May 15, 2018

(54) DEVICE FOR MEASURING THE TEMPERATURE OF A MEDIUM THROUGH A WALL

(71) Applicant: ABB Technology AG, Zurich (CH)

(72) Inventor: Peter Ude, Hanau (DE)

(73) Assignee: ABB Schweiz AG, Baden (CH)

( * ) Notice: Subject to any disclaimer, the term of this patent is extended or adjusted under 35 U.S.C. 154(b) by 245 days.

(21) Appl. No.: 14/977,684

(22) Filed: Dec. 22, 2015

(65) Prior Publication Data
US 2016/0178446 A1    Jun. 23, 2016

(30) Foreign Application Priority Data
Dec. 22, 2014    (DE) .......................... 10 2014 019 365

(51) Int. Cl.
| | |
|---|---|
| G01K 1/08 | (2006.01) |
| G01K 1/14 | (2006.01) |
| G01K 13/00 | (2006.01) |
| G01K 7/00 | (2006.01) |
| G01K 15/00 | (2006.01) |
| G01K 13/02 | (2006.01) |
| G01K 7/42 | (2006.01) |

(52) U.S. Cl.
CPC ............... *G01K 13/02* (2013.01); *G01K 7/42* (2013.01)

(58) Field of Classification Search
USPC .............................. 374/147, 148, 163, 208, 1
See application file for complete search history.

(56) References Cited

U.S. PATENT DOCUMENTS

| | | |
|---|---|---|
| 4,096,575 A | 6/1978 | Itoh |
| 5,920,617 A | 7/1999 | Berger et al. |
| 8,136,983 B2 * | 3/2012 | Razzaghi ................. G01K 7/42 374/103 |

FOREIGN PATENT DOCUMENTS

EP    2383556 A2    11/2011

* cited by examiner

*Primary Examiner* — Mirellys Jagan
(74) *Attorney, Agent, or Firm* — Leydig, Voit & Mayer, Ltd.

(57) ABSTRACT

A measuring device for determining the temperature of a medium in a container or a pipe has at least one temperature sensor, arranged on the outside of a container or pipe wall; an output for the temperature registered thereby; and an output for the measurement result obtained thereby. The device connects at least one first differentiator, capable of determining at least one first derivative of the progression over time of the temperature registered by the temperature sensor; at least one first multiplier for multiplying the derivative by a first factor which is a value for the time constant of the heat transfer through the wall; and at least one adder,
between the output of the temperature sensor and the output of the measuring device.

8 Claims, 10 Drawing Sheets

DEVICE FOR MEASURING THE TEMPERATURE OF A MEDIUM THROUGH A WALL

CROSS-REFERENCE TO RELATED APPLICATIONS

Priority is claimed to German Patent Application No. DE 10 2014 019 365.9, filed on Dec. 22, 2014, the entire disclosure of which is hereby incorporated by reference herein.

FIELD

The invention relates to a measuring device for determining the temperature of a medium in a container or pipe.

BACKGROUND

When measuring the temperature of a medium in a container or pipe, the problem often arises of the interior of the container or the pipe not being accessible for the measurement. The medium may, for example, be so aggressive or at such a high pressure that a sensor in the container or in the pipe would be destroyed. Therefore, in such cases the temperature is measured using a temperature sensor that is arranged on the outside of a wall of the container or pipe.

In particular for aggressive media or high pressures, a certain minimum wall thickness is however required which prevents the heat from passing therethrough to a sensor that is arranged on the outside of the wall. The measurement results are therefore often very imprecise.

SUMMARY

An aspect of the invention provides a measuring device configured to determine a temperature of a medium in a container or pipe, the device comprising: a measuring device output for a measurement result ($T_M$); a temperature sensor, is arranged on an outside of a wall of the container or pipe; a temperature sensor output for a temperature ($T_F$) registered by the temperature sensor; a first differentiator, capable of determining at least one first derivative of a progression over time of the temperature ($T_F$), registered by the temperature sensor; a first multiplier configured to multiply the first derivative by a first factor (F1), the first factor (F1) being a value for a time constant of heat transfer through the wall; and an adder, wherein the first differentiator, the first multiplier, and the adder are connected between the temperature sensor output and the measuring device output, wherein a first adder input is connected to a first multiplier output, wherein a second adder input is connected to the temperature sensor output independently of the first adder input, and an adder output is connected to the measuring device output for the measurement result ($T_M$).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention provides a measuring device which can measure the temperature of a medium in a container or pipe using a temperature sensor that is arranged on the outside of a wall of this container or pipe more precisely than is possible in accordance with the background art.

In the context of an aspect of the invention, a measuring device for determining the temperature of a medium in a container or a pipe has been developed. Said measuring device comprises at least one temperature sensor which is arranged on the outside of a wall of the container or pipe and comprises an output for the temperature registered thereby. The measuring device also has an output for the measurement result obtained thereby.

According to an aspect of the invention, at least one first differentiator, which is capable of determining at least one first derivative of the progression over time of the temperature registered by the temperature sensor, at least one first multiplier for multiplying the derivative by a first factor which is a value for the time constant of the heat transfer through the wall, and at least one adder are connected between the output of the temperature sensor and the output of the measuring device. A first input of the adder is connected to the output of the multiplier. A second input of the adder is connected to the output of the temperature sensor independently thereof. The output of the adder provides the measurement result from the measuring device and is therefore connected to the output for the measurement result.

It has been recognized that the wall of the container or pipe acts as a good approximation of a PT1 member in the transfer function at which a change in the temperature of the medium to the temperature registered by the temperature sensor propagates. If the temperature of the medium increases, the wall is first warmed and thus energy is stored therein before the temperature sensor also registers heating. If the temperature of the medium drops suddenly, the wall is conversely first cooled from the inside to the outside and some of the stored energy is released again before the temperature sensor registers cooling. The wall is therefore essentially an energy accumulator without amplification with a first-order delay.

As a result, if the temperature of the medium changes rapidly, the temperature of this temperature change that is registered by the temperature sensor lags by an amount which is proportional to the rate of change of the temperature registered at the temperature sensor. The constant of proportionality is the time constant of the heat transfer through the wall. For a given assembly made up of a temperature sensor and a wall, this time constant is fixed. It only needs to be determined once, and from then on its influence can be corrected out of the progression over time of the temperature using the circuit according to the invention, and thus the step response of the temperature measurement can be significantly improved.

The precision can be further improved by, according to a particularly advantageous embodiment of the invention, a series circuit made up of a second differentiator and a second multiplier being connected between the output of the first differentiator and a third input of the adder. The second multiplier multiplies by a second factor which is a value for the time constant of the temperature change in the temperature sensor.

It is taken into account herewith that, in addition to the wall, the temperature sensor itself also has a heat capacity and thus acts as an energy accumulator. The series connection of two independent energy accumulators acts as a PT2 member with a second-order delay in the transfer function at which the change in the temperature of the medium to the temperature registered by the temperature sensor propagates. Since the heat capacity of the sensor itself is significantly lower than the heat capacity of the solid wall, in the first order essentially only the heat capacity of the wall is relevant. The heat capacity of the sensor arises in the second order as an additional correction term. Tests have shown that, depending on the setup of the test apparatus, the first and the second derivative may play a role in the dynamic correction. It was possible to disregard higher derivatives.

Advantageously, at least one differentiator, adder and/or multiplier is designed as an analogue component. Such components are reliable and robust even under unfavorable environmental conditions. In addition, they are particularly rapid.

Alternatively thereto or in combination therewith, an evaluation unit is provided in which at least one differentiator, adder and/or multiplier is implemented as a digital processing step. This evaluation unit may in particular be a computer or a digital signal processor (DSP). Although such an evaluation unit is more complex, it is however also much more flexible than a purely analogue circuit.

In a particularly advantageous embodiment of the invention, a correction apparatus for suppressing the influence of the ambient temperature prevailing outside the container or pipe is connected between the output of the temperature sensor and the input of at least one differentiator. The temperature sensor generally cannot be completely shielded from the environment, and therefore registers a mixed temperature composed of the temperature on the surface of the wall and the ambient temperature. By this disturbing influence being corrected out, the measurement precision is further increased.

Here, the correction apparatus may in particular comprise at least one ambient-temperature sensor and a processor for obtaining an approximate value for the temperature of the wall at the location of the temperature sensor. The processor may then in particular be integrated in the evaluation unit.

The factors for the multipliers are dependent on the structure of the temperature sensor, on its environment and on its link to this environment. Said factors in particular depend on how well the temperature sensor is insulated from its environment. In principle, the same factors are considered to be optimal for identical sensors or sensor structures. This means that an optimal set of factors can be unambiguously assigned to such a configuration.

In tests, it was possible to identify this optimal set of factors empirically in each case on the basis of the step response to a sudden increase in temperature. Excessively high values for the factors become noticeable in that the progression over time of the measurement result provided by the measuring device begins to oscillate.

Figure 1:
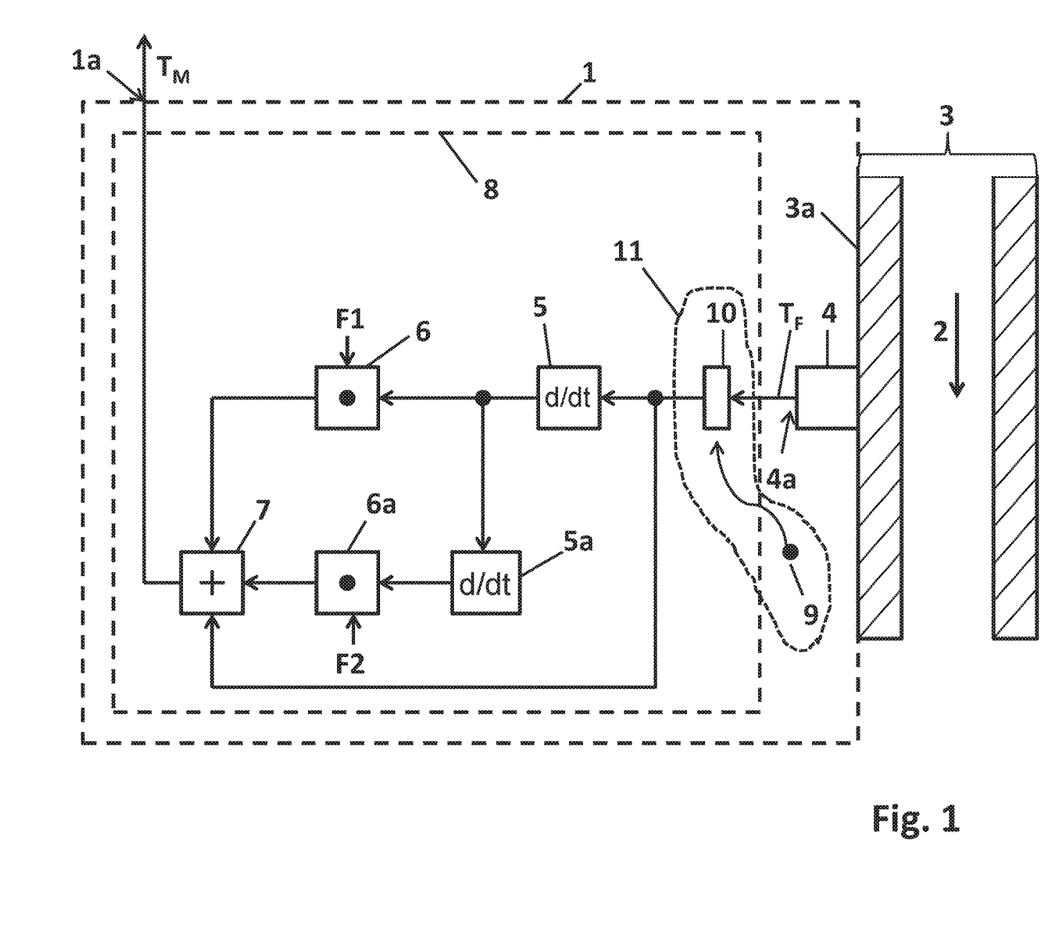
FIG. 1 is a block diagram of the measuring device according to the invention.

FIG. 1 is a block diagram of an embodiment of the measuring device 1 according to the invention. The temperature is to be measured of a medium 2 which flows in a tube 3 in the direction of the arrow. The temperature sensor 4 is arranged on the wall 3a of this tube 3. The output 4a thereof is connected to the input of a processor 10 which obtains an approximate value for the temperature of the wall 3a at the location of the temperature sensor 4 from the temperature value TF provided by the sensor 4 in conjunction with the ambient temperature measured by a sensor 9. The ambient-temperature sensor 9 and the processor 10 together form the correction apparatus 11. The approximate value for the temperature of the wall is fed to a differentiator 5. The time derivative obtained by the differentiator is multiplied by the multiplier 6 by a factor F1 which is a value for the time constant of the heat transfer through the wall 3a. The result is fed to a first input of the adder 7. The time derivative obtained by the differentiator 5 is time-derived again by a second differentiator 5a. The result is multiplied by the second multiplier 6a by the factor F2 and is fed to the second input of the adder 7. Lastly, the approximate value for the temperature of the wall that is obtained by the processor 10 is also fed directly to the third input of the adder 7. The processor 10, the differentiators 5 and 5a, the multipliers 6 and 6a and the adder 7 are combined in the evaluation unit 8. The output of the adder 7 provides the measurement result TM to the measuring device at its output 1a.

Figure 2A:
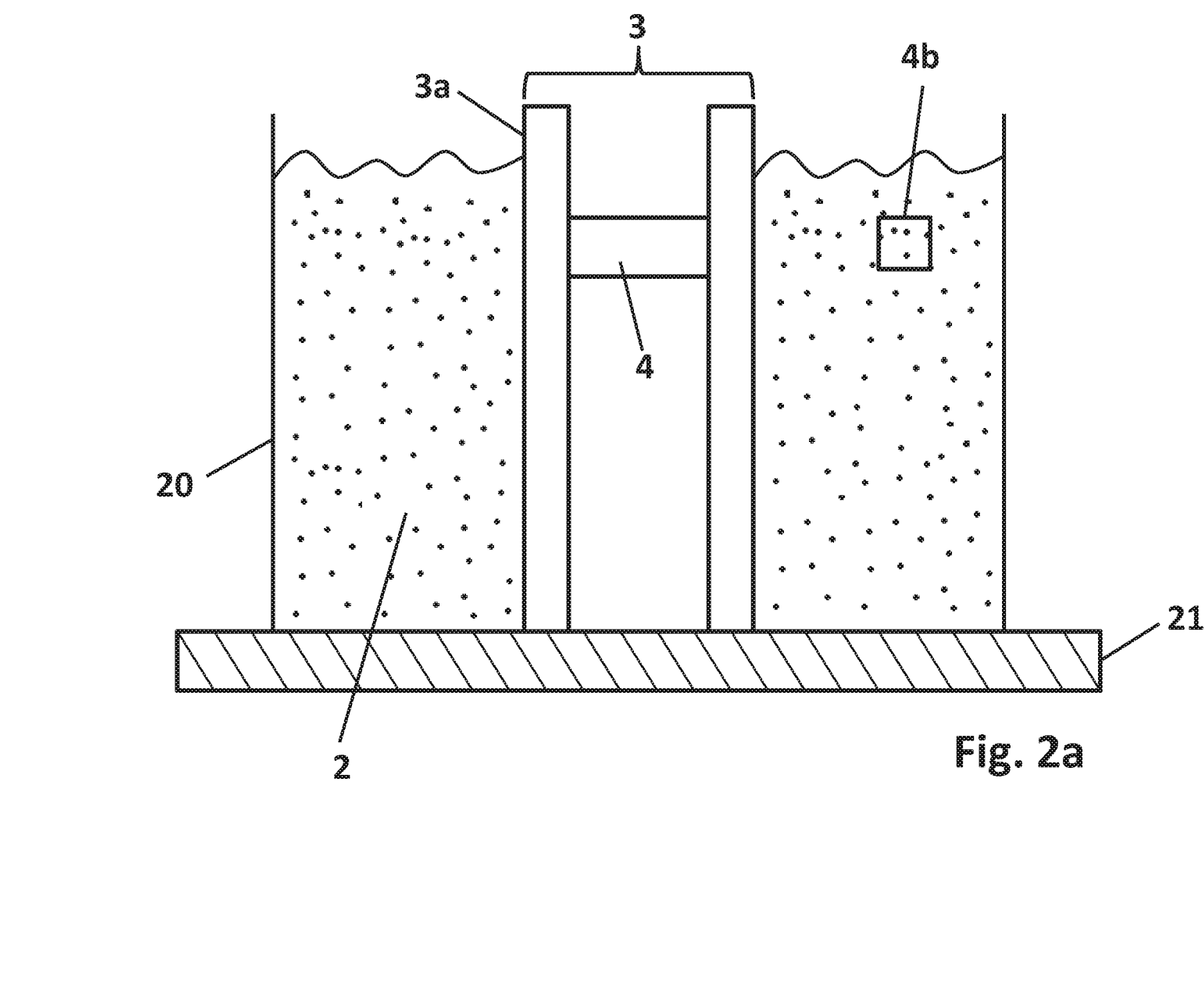
FIG. 2(a)-(e) show the measurement setup for determining the factors for the multipliers.

FIG. 2a schematically shows a measurement setup for obtaining the factors for the multipliers 6 and 6a. A test piece of the tube 3 is placed in a test tank 20 in which there is a medium 2. The interior of the tube 3 does not contain the medium 2. In this interior, the temperature sensor 4 is coupled to the inside of the wall 3a of the tube 3. In order to monitor the actual temperature of the medium 2, a PT100-type temperature-dependent platinum resistor is arranged within the medium 2, close to the wall 3a, as an additional reference temperature sensor 4b.

The concept behind this setup is that the time constants of the heat transport from the medium 2 through the wall 3a to the temperature sensor 4 are not dependent on the direction of this transport. The temperature sensor 4 thus reacts to a sudden increase in temperature of the medium 2 in the same way as in the setup according to FIG. 1. It would, however, be more difficult to use the setup in FIG. 1 to obtain the time constants, since the medium 2 is flowing through the interior of the tube 3 and said interior also has to contain the additional reference temperature sensor 4b.

In order to obtain the factors, the test tank 20 was first filled with iced water as the medium 2 and a wait ensued until a thermal equilibrium was reached. The medium 2 was then heated to a temperature of between 50° C. and 70° C. by an external heating plate 21 arranged under the test tank 20. The progressions over time of the measurement result TM generated by the temperature sensor 4 and of the actual temperature of the medium 2 registered by the reference temperature sensor 4b were determined in parallel. The factors for the multipliers 6 and 6a were optimized as fit parameters in order to produce the best possible agreement between the two progressions over time.

A measuring device 1 was used for these tests in which the differentiators 5 and 5a, the multipliers 6 and 6a and the adder 7 were combined in a compact programmable head transmitter which was connected to the temperature sensor 4.

In FIGS. 2b to 2e, for various factors F1 and F2 of the multipliers 6 and 6a, the measurement result TM (dotted line) and the actual temperature T of the medium 2 (dashed line) are plotted against the time t in each case. FIGS. 2b to 2e show example curves, which were determined during various tests; therefore, the sudden increase in temperature caused by the heating plate 21 in FIGS. 2b to 2e takes place at different points in time and is also at different levels.

The measured values were each recorded at equidistant, separate points in time. Therefore, the continuous numbering n of these equidistant measurement points is plotted on the time axis. Both time derivatives were therefore each approximated by means of a difference quotient. The nth value TM[n] of the measurement result was therefore obtained from the values for the temperature TF provided by the temperature sensor 4 in accordance with the formula $$TM[n]=TF[n]+F1*(TF[n]-TF[n-1])+F2*(TF[n-1]-TF[n-2]).$$

Figure 2B:
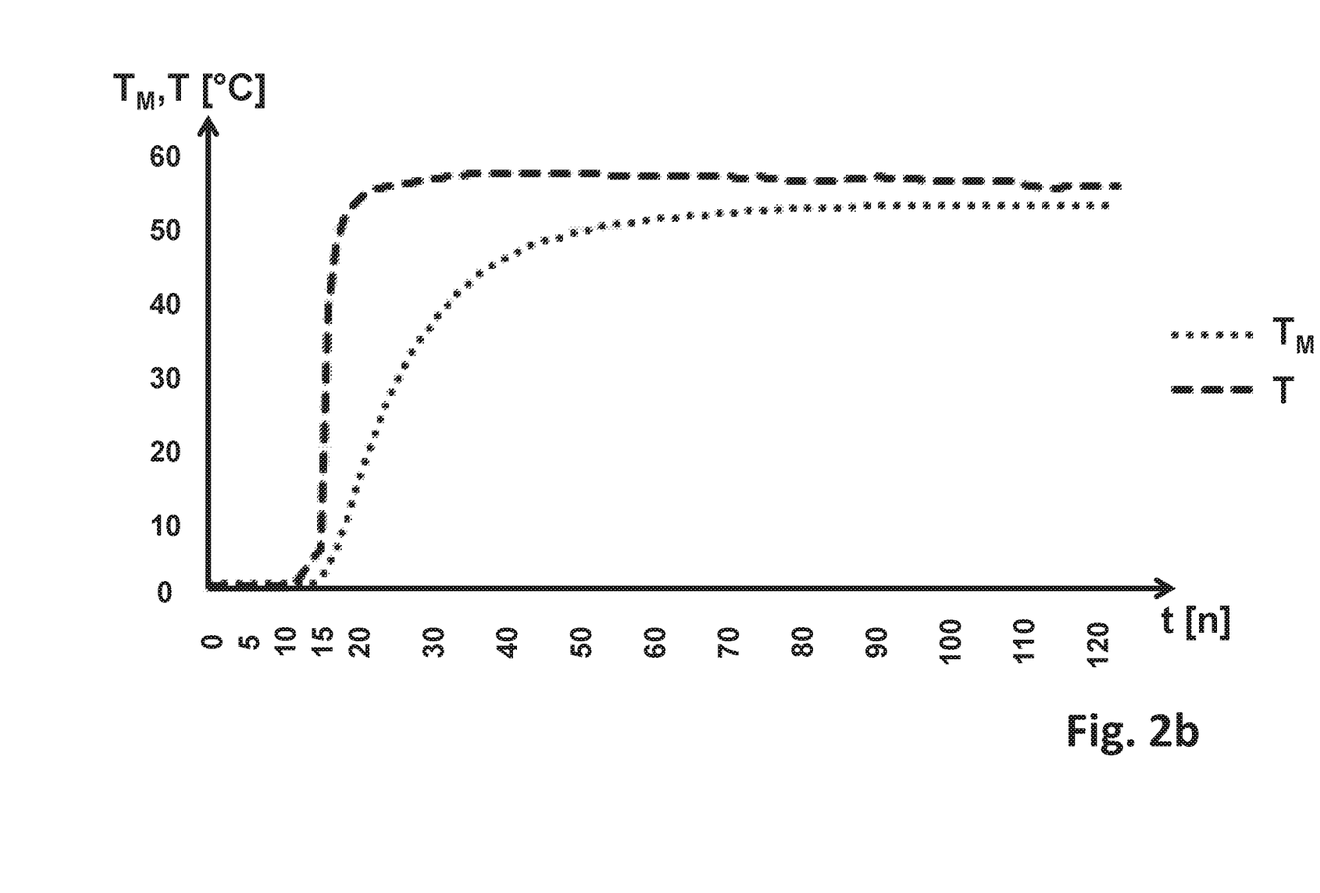

In FIG. 2b, both factors are zero. They are therefore both multipliers 6 and 6a without an effect on the measurement result TM. Therefore, FIG. 2b shows the progression over time of the measurement result TM, as could be obtained in accordance with the background art. The measurement result TM only approaches the actual temperature T very slowly; the sudden increase in temperature caused by the heating plate 21 is qualitatively no longer noticeable per se.

Figure 2C:
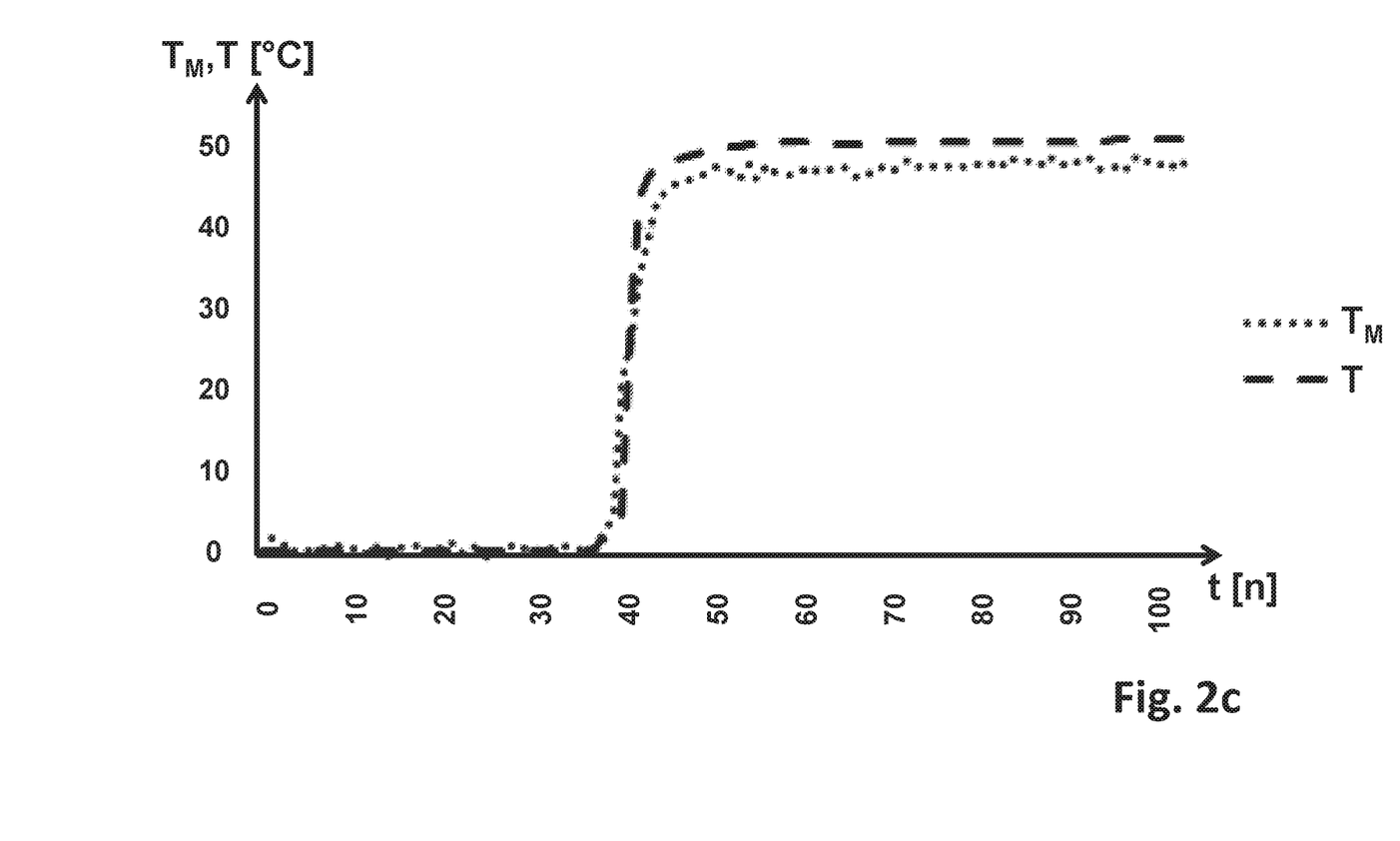

By setting both factors to a first starting value 30 (in arbitrary units), in FIG. 2c the progression over time of the measurement result TM could be brought into much better agreement with the progression over time of the actual temperature T. The sudden increase in the actual temperature T is represented qualitatively per se in the measurement result TM. However, the measurement result TM for the actual temperature T runs ahead slightly at the start of the sudden increase and then subsequently lags behind, and there is also still a remaining discrepancy between TM and T long after the sudden increase.

Figure 2D:
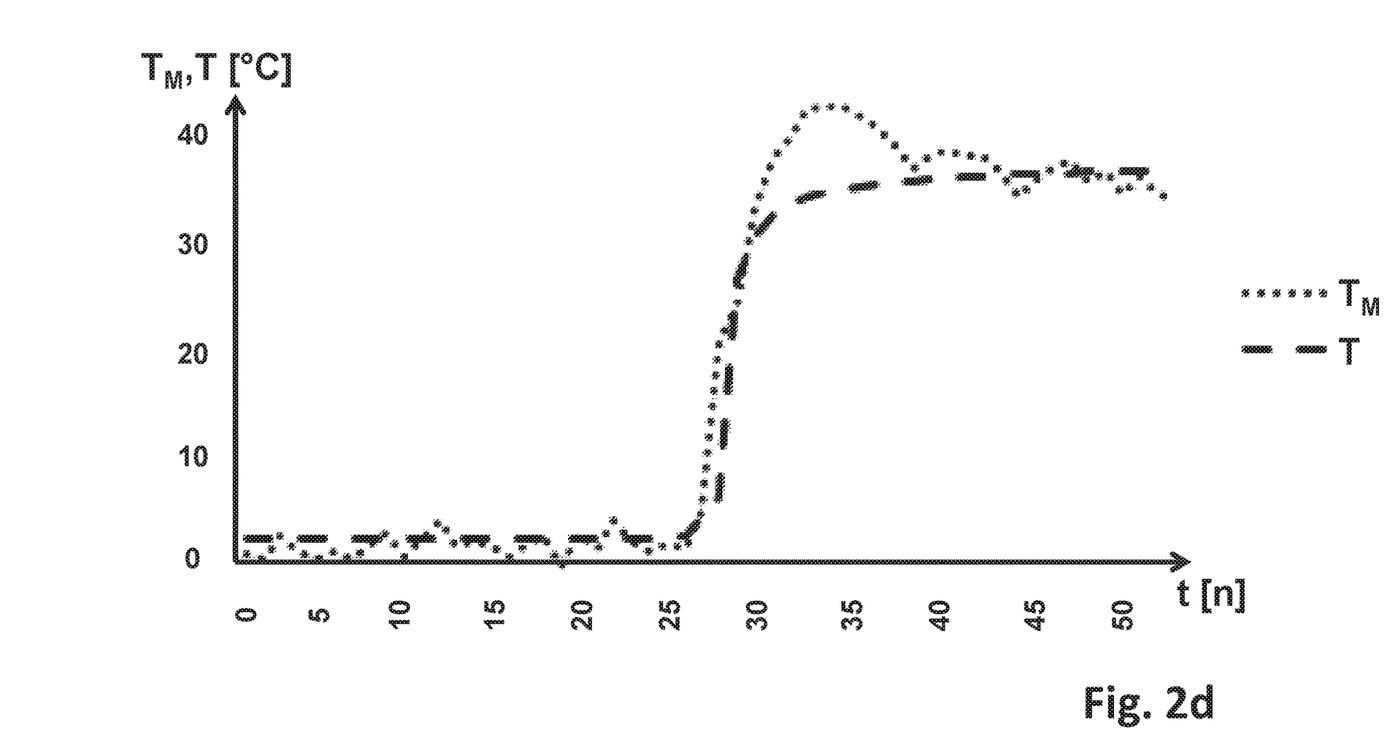

FIG. 2d shows that the test for overcoming this by a further increase of both factors to 50 was unsuccessful. At the end of the sudden increase, TM not only heavily overshoots T, but also oscillates around the nominally constant value of T both before and after the sudden increase.

Figure 2E:
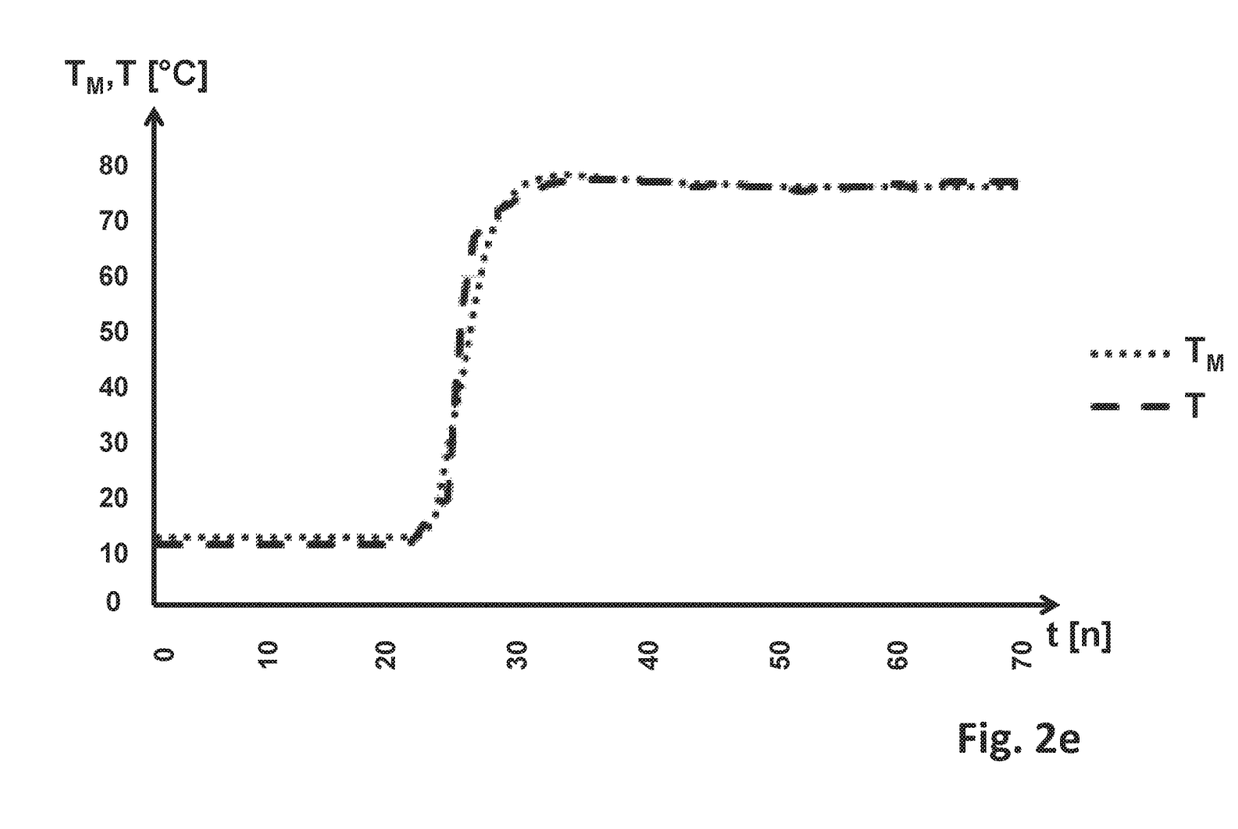

In the tests, it became apparent that a noise present in the progression over time of the temperature TF registered by the temperature sensor 4 is transferred in amplified form into the progression over time of the measurement result TM. In FIG. 2e, the measured values were therefore moderated by an average value being produced in each case from five successive measured values. The factors F1 and F2 were adjusted thereto; F1 was set to 30, and F2 was set to 10.

FIGS. 2b to 2e show that a person skilled in the art can obtain the factors F1 and F2 for the multipliers 6 and 6a for a new assembly made up of a specific tube 3 and a specific temperature sensor 4 in a reasonable number of tests. On one hand, the search space is of a manageable size, and on the other hand, when failures start to occur, a person skilled in the art also receives at least one qualitative indication of the direction in which he needs to proceed.

Figure 3:
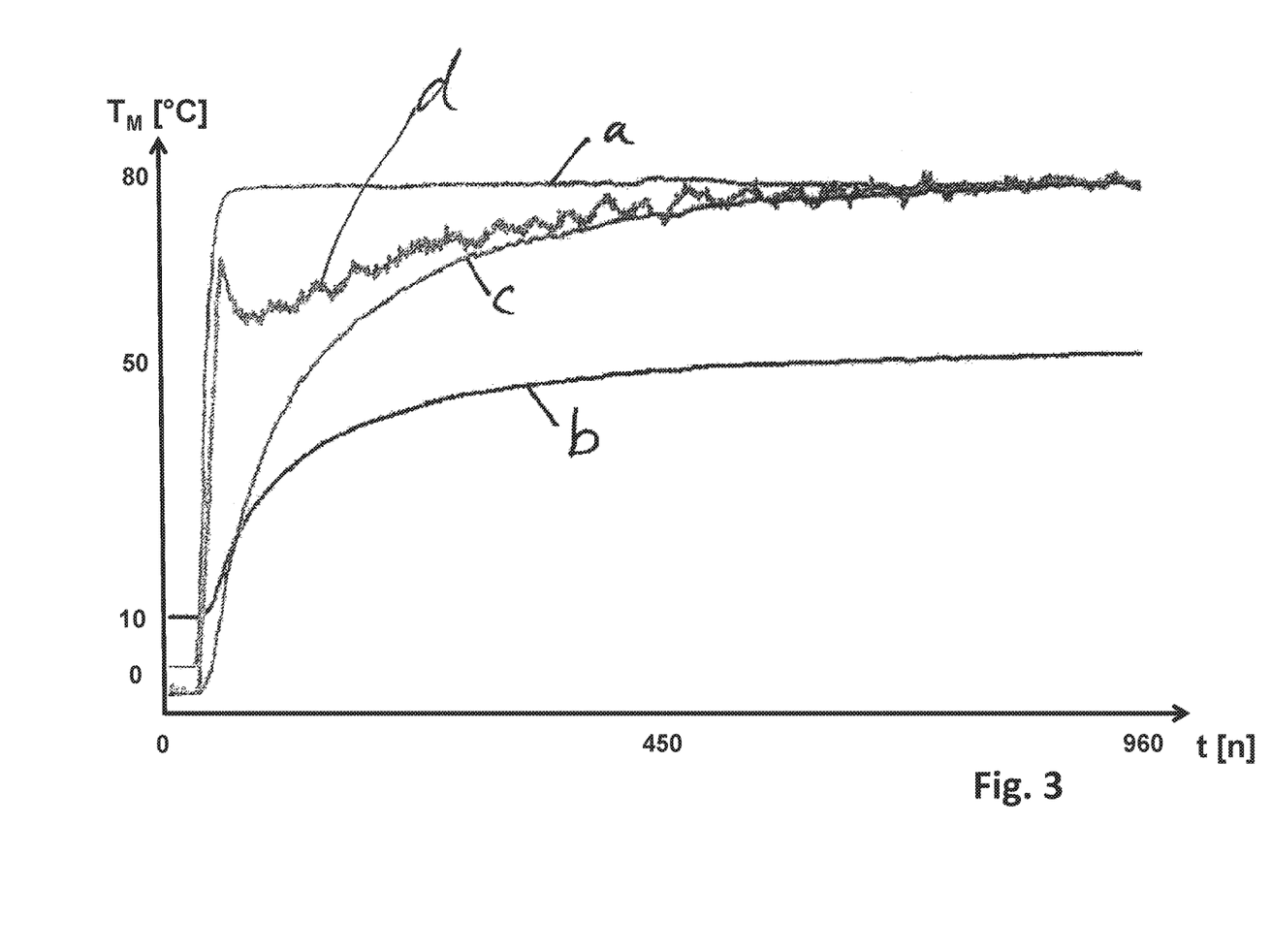
FIG. 3 shows an improved step response for the measuring device according to the invention.

In FIG. 3, the step response of the measuring device according to the invention is compared with the step response of a measuring device according to the background art. Again, the numbering n of the equidistant measuring points is plotted on the time axis t.

The temperature TM of the relevant sensor over the time t that is registered when the temperature of the medium 2 in question suddenly changes from 0° C. to 80° C. is plotted in each case. Curve a shows the progression over time of the temperature TM that is registered by a sensor which is coupled to the medium 2 in the best possible manner. This sensor is arranged within the medium 2. For the measurements using a temperature sensor that is arranged on the outer wall of the pipe 3, curve a is an ideal state that generally cannot be achieved, and using which the quality of the measurement can be assessed.

Curve b shows the progression over time of the temperature TM as is registered by a temperature sensor 4 according to the background art. Irrespective of the bad step response, the temperatures later in the progression are also much too low.

There is significant improvement if the influence of the ambient temperature is corrected out using the correction apparatus 11 (curve c). At least in the steady state, the measurement results approach the ideal value. At the same time, the step response is already significantly improved.

The correction according to the invention of the time delay during the heat transfer (curve d) again causes a significant increase in precision specifically for the time period directly after the sudden increase in temperature. The sudden increase in temperature, which was no longer noticeable at all per se in curves b and c, is qualitatively reproduced. The absolute values for the temperature also approach the ideal state shown in curve a considerably more rapidly.

Figure 4A:
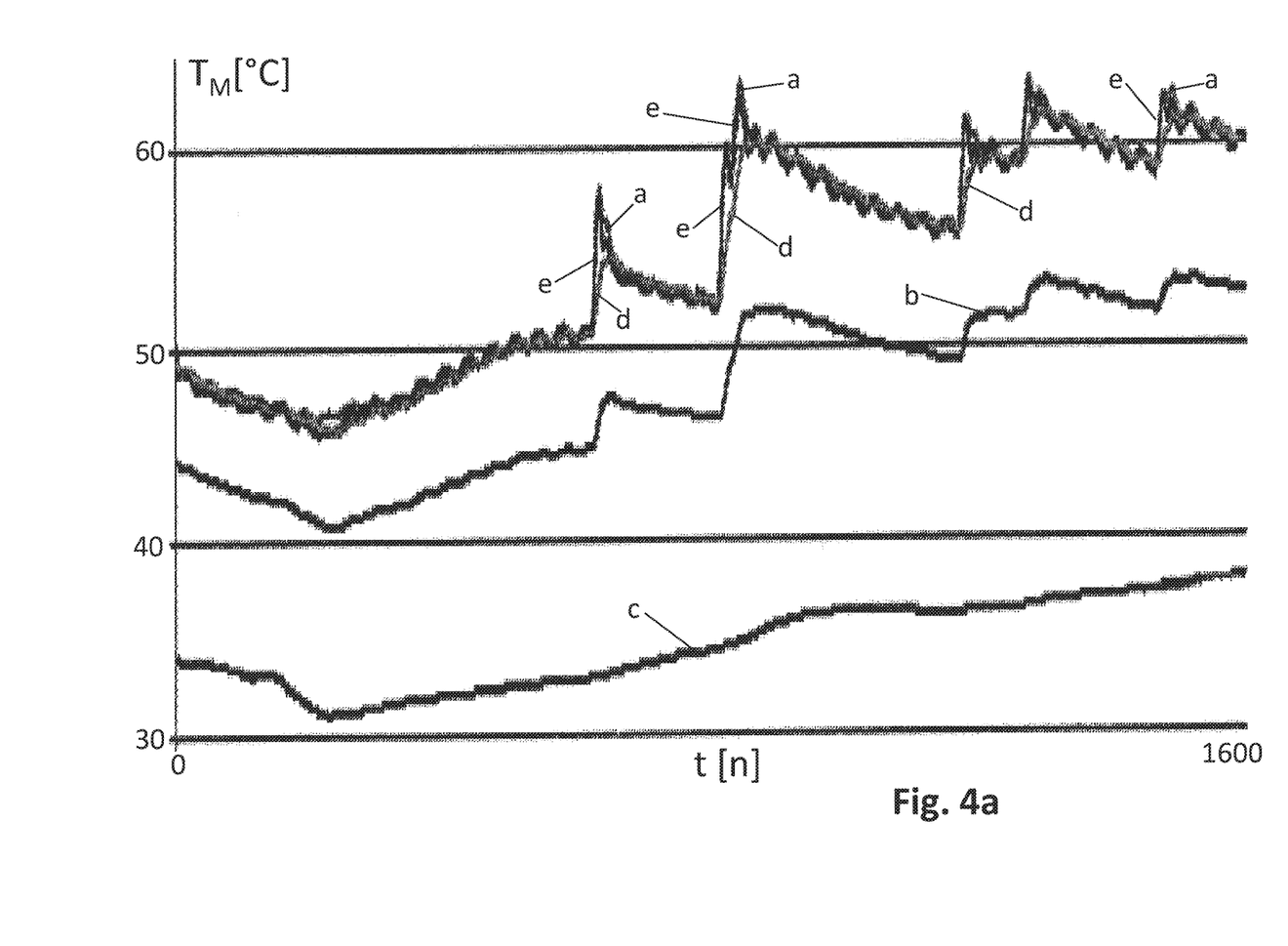
FIG. 4(a)-(c) show a comparison of the measuring device according to the invention with a measuring device according to the prior art, using the example of an actual temperature/time profile.

FIG. 4a shows, on the basis of an actual test, how a complex temperature/time profile of various sensors is represented. The numbering n of the equidistant measurement points is again plotted on the time axis t.

Similarly to FIG. 3, curve a shows the progression over time of the temperature TM which was measured using a sensor arranged in the flow of the medium 2. In an actual application, this measurement is not possible, or is only possible with unreasonable complexity, and therefore curve a is an ideal state thereof, towards which efforts are directed during a measurement on the outside of the pipe 3.

Curve b shows how the temperature/time progression of a prior-art temperature sensor 4 arranged on the outside of the wall 3a of the pipe 3 is reproduced. The measured values were merely moderated by generated average values. Irrespective of the fact that the temperature is far too low, most of the features in the temperature/time progression are smoothed out. Only a vague representation of the actual temperature/time progression is still noticeable.

The fact that the temperature is measured to be far too low is essentially due to the fact that the ambient temperature is not taken into account. This is shown by curve d, in which the influence of the ambient temperature, the progression over time of which is shown by curve c, has been corrected out. Curve d is a version of the ideal state according to curve a that has been heavily smoothed out over time, and in the steady state is practically identical to this ideal state. The discrepancy between this and curve b below is greater the higher the ambient temperature. The measured values for the ambient temperature were also moderated by producing average values.

Curve e shows how the temperature/time progression of a measurement system according to the invention is reproduced, in which both the influence of the ambient temperature and the time delay in the heat transfer through the wall 3a are corrected out. The ideal state according to curve a is almost completely reproduced. Only in the region of very sudden changes in temperature are there still small discrepancies.

Figure 4B:
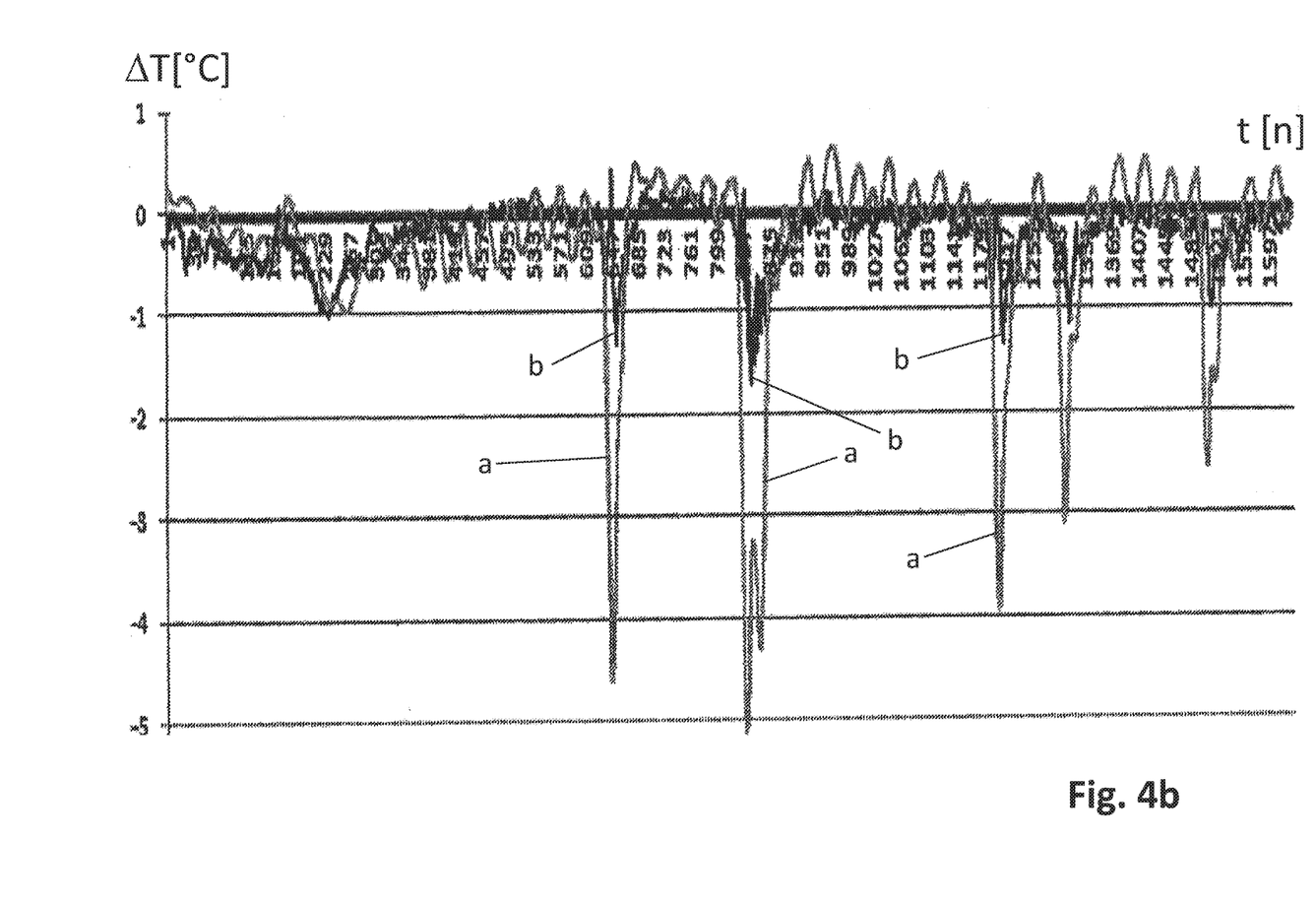

FIG. 4b shows, in an enlarged manner on the temperature scale, how the step response is improved by means of the correction according to the invention of the time delay. Curve a in FIG. 3b signifies the difference ΔT between curves d and a in FIG. 3a. Curve b in FIG. 3b signifies the difference ΔT between curves e and a in FIG. 3a. It is clear that sudden changes in temperature are represented in much more precise detail using the measuring device according to the invention than using the correction to the ambient temperature alone.

Figure 4C:
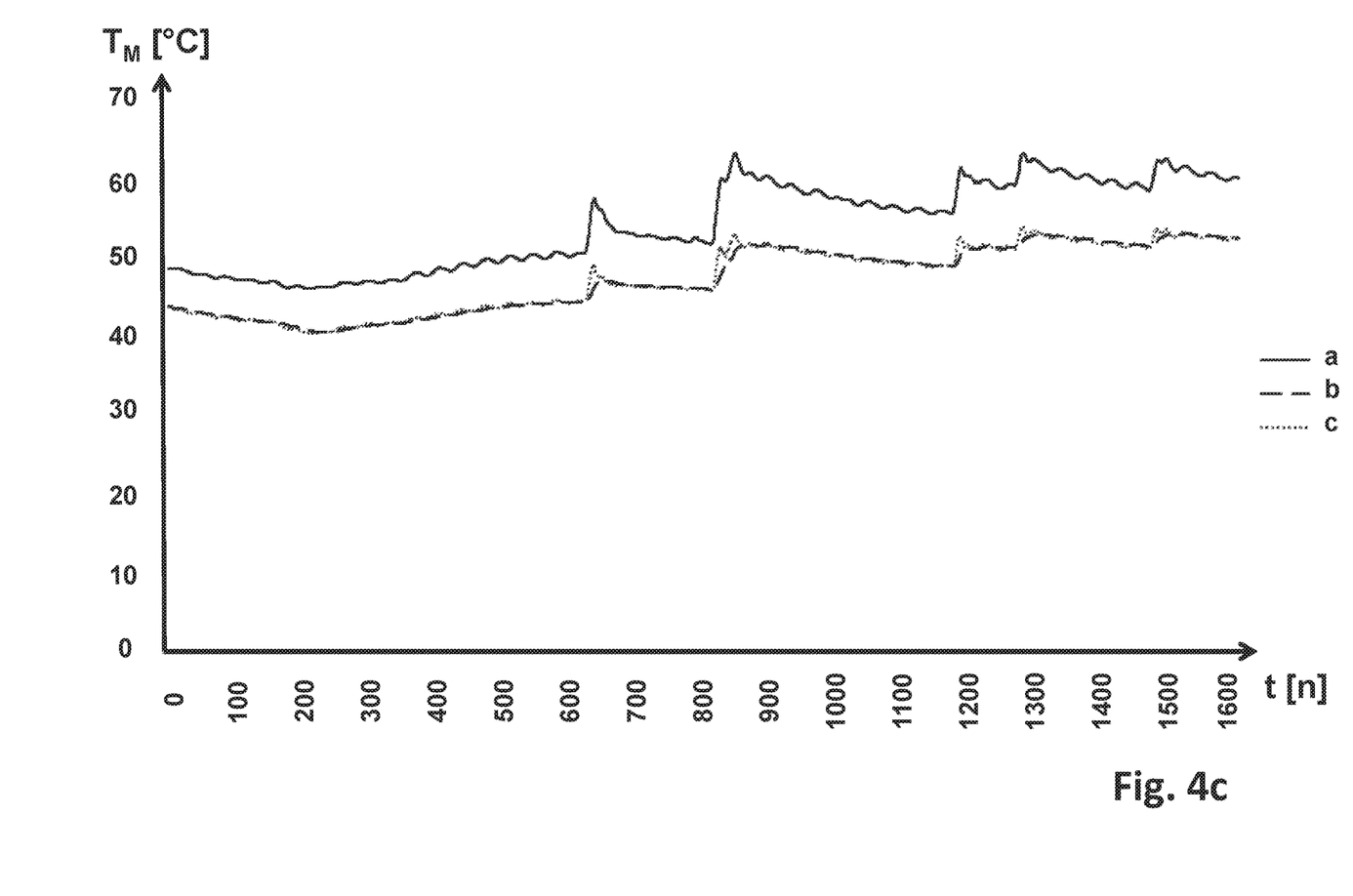

For the purpose of better distinguishing which improvement is brought about by the static correction of the ambient temperature and which improvement is brought about by the dynamic correction of the time constants, the static correction was left out of FIG. 4c. Curve a in FIG. 4c shows, similarly to curve a in FIG. 4a, the progression over time of the temperature TM that was measured using a sensor arranged in the flow of the medium 2. Curve b shows, similarly to curve b in FIG. 4a, the temperature/time progression that is reproduced by a prior-art temperature sensor 4 arranged on the outside of the wall 3a of the pipe 3. The measured values were only moderated by producing average values. Curve c shows the progression over time of the temperature TM that was measured using the measuring device according to the invention without correction of the ambient temperature.

Even if the measured temperature was now far too low, considerable progress from the prior art has already been demonstrated using the dynamic correction alone, without additional correction of the ambient temperature. Important qualitative details of the progression over time shown in curve a that are completely missing from the prior art (curve b) have reappeared. This qualitative knowledge of the progression over time may be sufficient for many applications.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS 1 measuring device
1a output of the measuring device 1 for the measurement result TM
2 medium
3 container or pipe
3a wall of the container or pipe 3
4 temperature sensor
4a output of the temperature sensor 4
4b additional reference temperature sensor
5, 5a differentiators
6, 6a multipliers
7 adder
8 evaluation unit
9 ambient-temperature sensor
10 processor
11 correction apparatus
20 test tank
21 heating plate
F1 factor of the multiplier 6
F2 factor of the multiplier 6a
TF temperature registered by the temperature sensor 4
TM measurement result of the measuring device 1
ΔT temperature difference

The invention claimed is:

1. A measuring device configured to determine a temperature of a medium in a container or pipe, the device comprising:
    a measuring device output for a measurement result ($T_M$);
    a temperature sensor, arranged on an outside of a wall of the container or pipe;
    a temperature sensor output for a temperature ($T_F$) registered by the temperature sensor;
    a first differentiator, capable of determining at least one first derivative of a progression over time of the temperature ($T_F$), registered by the temperature sensor;
    a first multiplier configured to multiply the first derivative by a first factor (F1), the first factor (F1) being a value for a time constant of heat transfer through the wall; and
    an adder,
    wherein the first differentiator, the first multiplier, and the adder are connected between the temperature sensor output and the measuring device output,
    wherein a first adder input is connected to a first multiplier output,
    wherein a second adder input is connected to the temperature sensor output independently of the first adder input, and
    an adder output is connected to the measuring device output for the measurement result ($T_M$).

2. The device of claim 1, wherein the first differentiator, the adder, and/or the first multiplier is an analog component.

3. The device of claim 1, further comprising:
    an evaluation unit, in which the first differentiator, the adder, and/or the first multiplier is implemented as a digital processing step.

4. The device of claim 1, further comprising:
    a series circuit, including a second differentiator and a second multiplier, including a second factor (F2) which is a value for the time constant of a temperature change in the temperature sensor, connected between a first differentiator output and a third adder input.

5. The device of claim 4, wherein the first differentiator, the second differentiator, the adder, the first multiplier, and/or the second multiplier is an analog component.

6. The device of claim 1, further comprising:
    a correction apparatus configured to suppress an influence of ambient temperature, prevailing outside the container or pipe, connected between the temperature sensor output and an input of at least one differentiator.

7. The device of claim 6, wherein the correction apparatus includes an ambient-temperature sensor and a processor configured to obtain an approximate value for a wall temperature at a temperature sensor location.

8. The device of claim 7, further comprising:
an evaluation unit, in which the first differentiator, the adder, and/or the first multiplier is implemented as a digital processing step,
wherein the correction apparatus is integrated into the evaluation unit.

* * * * *